United States Patent [19]
Poveromo

[11] 3,710,446
[45] Jan. 16, 1973

[54] ADJUSTABLE DENTURE ATTACHMENT

[76] Inventor: Melvin D. Poveromo, c/o Bay Harbor Medical Center, 1160 Kane Concourse, Suite 203, Bay Harbor Islands, Fla. 33154

[22] Filed: May 7, 1971

[21] Appl. No.: 141,184

[52] U.S. Cl. ....................................................32/5
[51] Int. Cl. ..........................................A61c 13/22
[58] Field of Search.........................32/5, 6, 7, 8, 9

[56] References Cited

UNITED STATES PATENTS

| | | | |
|---|---|---|---|
| 1,680,305 | 8/1928 | Stern | 32/5 |
| 1,765,851 | 6/1930 | Richardson | 32/5 |
| 2,271,796 | 2/1942 | Eckman | 32/5 |

Primary Examiner—Robert Peshock
Attorney—Robert G. McMorrow

[57] ABSTRACT

An attachment means for the connection of a denture to a natural or artificial tooth has a female housing anchored in said tooth and a multi-part connector associated with the denture. The connector includes an insert and a connector housing from which an expandable head of the insert extends for engagement in the female housing. The head is bifurcated, and has a bore receiving a horizontal expander screw, and the insert is maintained in engagement in the connector housing by an interfit and by transverse fasteners. The latter are optionally of resilient form.

6 Claims, 6 Drawing Figures

PATENTED JAN 16 1973 3,710,446

INVENTOR
MELVIN D. POVEROMO
BY
Robert G. McMorrow
ATTORNEY

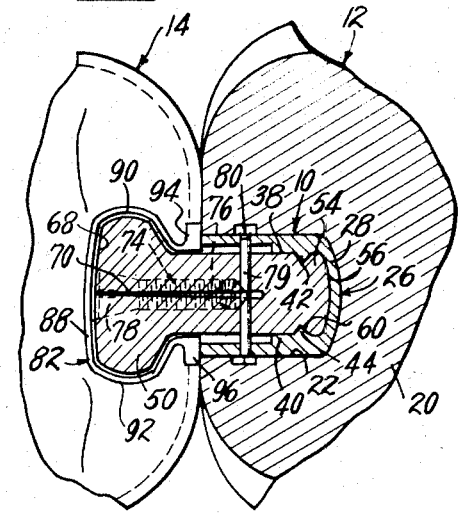
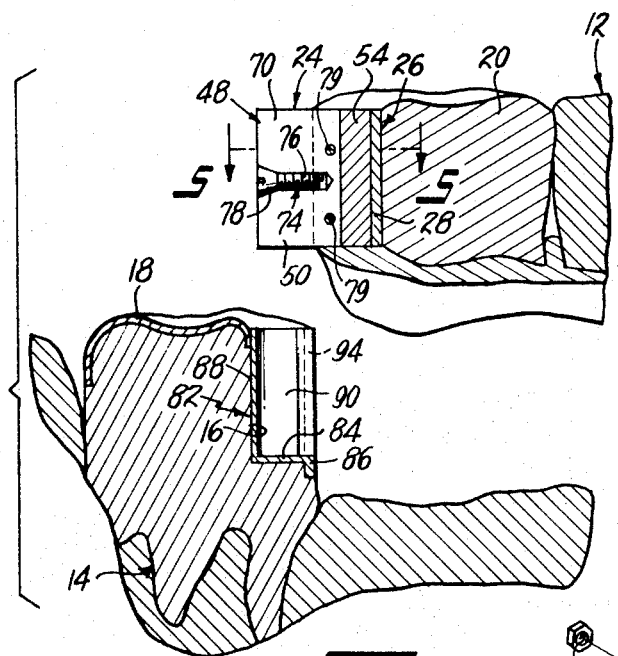
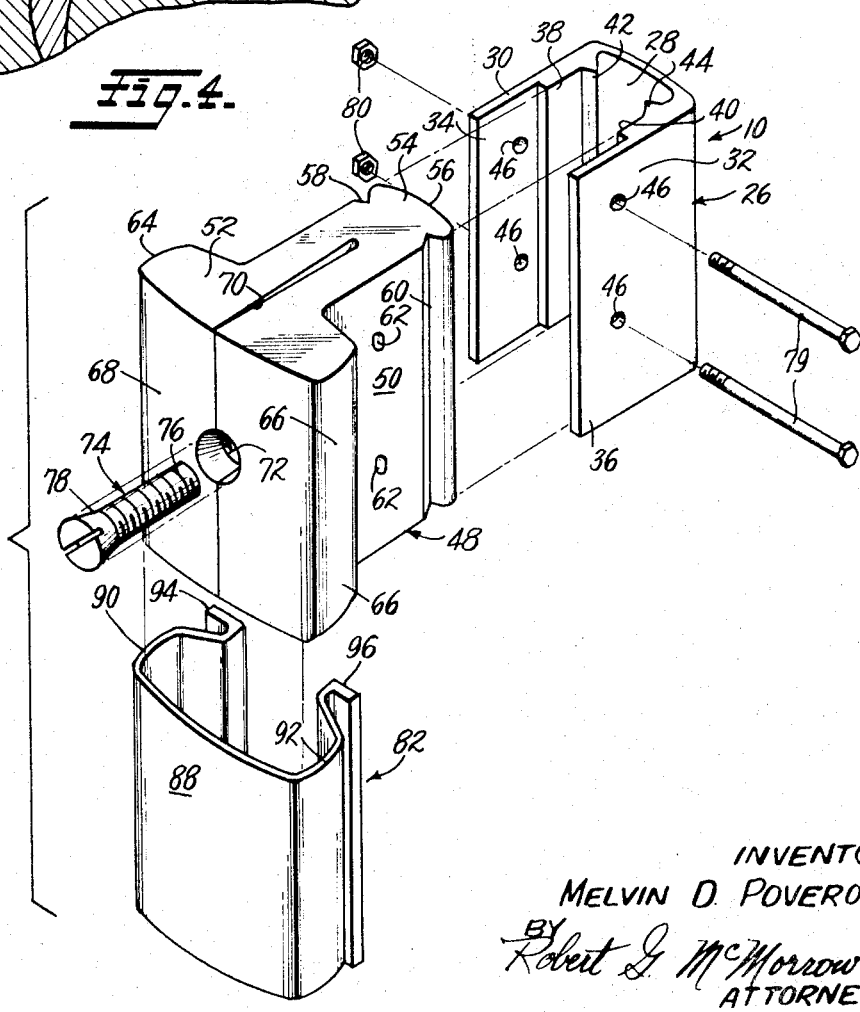

3,710,446

ADJUSTABLE DENTURE ATTACHMENT

BACKGROUND OF THE INVENTION

1. Field of the Invention

This invention pertains to improvements in denture attachment means, and to an adjustable connector for engagement of a denture in place.

2. Statement of the Prior Art

The most relevant prior art to this invention is my prior U.S. Pat. No. 3,117,377. In that patent, it is explained that denture connectors comprising interengaged male and female members have been known in dentistry for a substantial period of time. A further example in the patented art of such devices is seen in Eckman U.S. Pat. No. 2,271,796. Such devices include interengaged male and female members, with vertical screw means used to expand the male member after insertion.

SUMMARY OF THE INVENTION

The present invention is directed to the provision of an attachment means which is adjustable in either of two different directions. Specifically, vertical adjustment is made possible through the modification of positioning of the insert with respect to the female housing. Also, angular relation of the denture to the adjacent anchor tooth is made possible. Prior art constructions wherein an initial tight fit exists between the male and female members do not admit of such adjustments. More particularly, the present construction supplies a means for accomplishing initially a loose fit between the components and thereafter establishing a final fit of very close tolerance therebetween.

It has been determined that the dimension of the male head in such attachments is critical to satisfactory performance. Specifically, this element must be of sufficiently diminutive size to retain vertical stresses parallel to the longitudinal axis of the tooth to which it is connected. By provision of a horizontal expander screw, as opposed to the vertical screws of the prior art, dimensions may be retained at a minimum while still permitting the desirable feature of an initial loose fit.

Still another innovation of this invention resides in the manner of connection of the insert to the connector housing. Here, such connection is effected through the medium of mechanical connectors employing either brads or screws extending through transverse, coaxial apertures. The apertures are vertically elongated relative to the brads or screws, thus allowing the housing to settle vertically and providing strain relief.

Other and further objects and advantages of the invention will become apparent to those skilled in the art from a consideration of the following specification when read in conjunction with the annexed drawings.

BRIEF DESCRIPTION OF THE DRAWINGS

FIG. 4 is a disassembled sectional view;

FIG. 5 is a second transverse sectional view, taken on line 5—5 of FIG. 4, with the components in assembled condition; and FIG. 6 is an enlarged, disassembled perspective view of the attachment means per se.

DESCRIPTION OF THE PREFERRED EMBODIMENT

Figure 1:
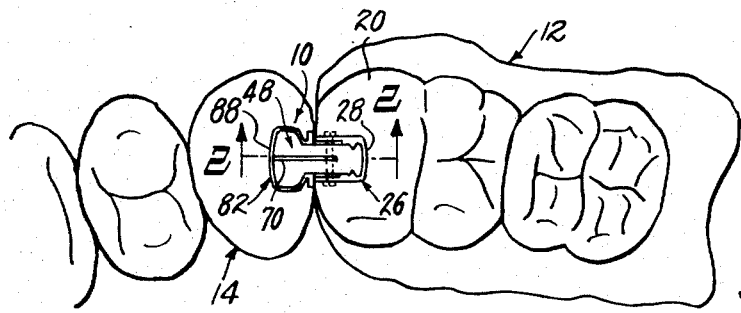
FIG. 1 is a plan view showing a denture mounted by means of an improved attachment constructed and assembled in accordance with the teachings of this invention.
Figure 2:
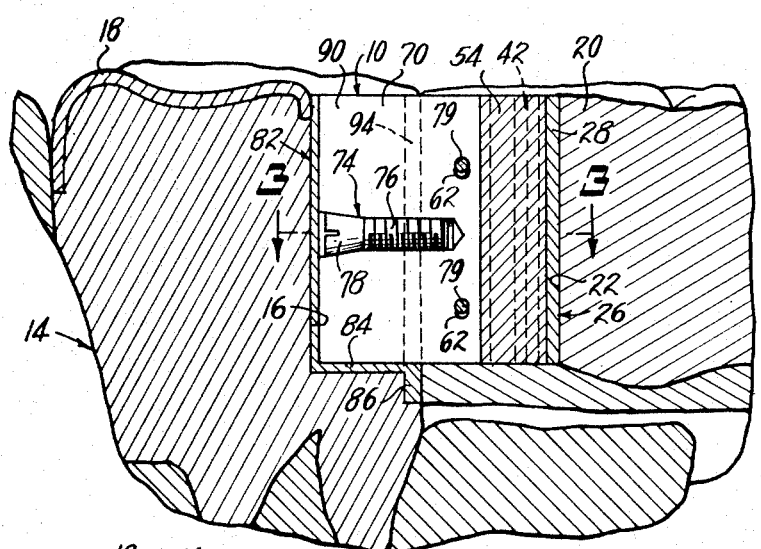
FIG. 2 is an enlarged, vertical cross-section taken on line 2—2 of FIG. 1, looking in the direction of the arrows.

Referring to the drawing in more detail, the attachment of this invention is therein generally identified by reference character 10. In the illustrated environment of use, the attachment 10 secures a denture 12 to an anchor or abutment tooth 14 which is normally a natural tooth having a recess 16 formed therein to receive a component of the connector, and having a protective crown 18. The denture 12 similarly has a first tooth member 20 with a special recess 22 therein.

The attachment 10 includes a multi-part male connector 24 shown assembled in FIG. 4. In FIG. 6, the disassembled components of the male connector are best seen. Said components include a normally vertically disposed channel form housing 26 formed, like the remainder of the connector components, of metal or a similar rigid substance, and having a bight portion 28, and a pair of confronting side arms 30 and 32. The arms have distal end portions 34, 36, and relatively thick proximal end sections 38, 40, the latter being provided with inwardly projecting, pointed ribs 42, 44 serving a function described below. The distal ends of the arms have transverse openings 46 formed therein.

The connector 24 further comprises an insert 48 having a shank section 50 and an enlarged head 52. The shank section has an end portion 54 with a wall 56 which is complementary in configuration with the inside of the bight 28, and which has vertical slots 58, 60 formed in its sides and extending vertically which interfit with the ribs 42 and 44 of the arms. The shank section 50 is of substantially uniform thickness, except for the slots 58, 60, whereby it is of substantially less transverse thickness than the normal distance between the arm distal end portions 34 and 36. Formed in the section 50 are transverse, vertically elongated openings 62 which are adapted for alignment with the respective openings 46 of the arms.

Figure 3:
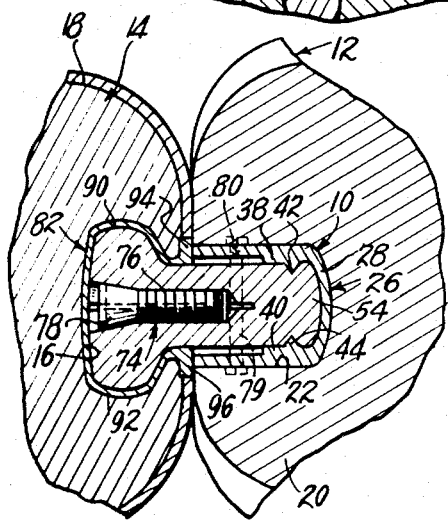
FIG. 3 is a transverse sectional view through the assembly from line 3—3 of FIG. 2, looking in the direction of the arrows.

The head 52 of the insert includes outwardly angled side walls 64, 66 and a curvilinear forward wall 68. Extending medially into the insert and opening on the wall 68 is a slot 70 of substantial depth which serves to divide or bifurcate the insert. A threaded bore 72, having an enlarged, tapered entry portion extends into the head and the slit with the slit at its approximate center line, the bore entry section opening on the wall 68. Operatively disposed in the bore is a screw 74, best shown in FIG. 3, having a substantially cylindrical threaded section 76 and a tapered head 78. As may be noted at this point, extension of the screw 74 into the bore 72 results in expansion of the head 50 of the insert occasioned by cam action of the tapered screw head against said entry section of the bore.

Several optional means may be supplied for affixation of the insert 50 in its housing 26. Such means include changeable fasteners such as the screw 79 and nut 80 combination shown in the drawing, or rivets or brads of various types. Stress relief may also be provided by the use of elongated plastic brads — reinforced where necessary by rigid metallic cores. In either event, the fasteners are extended through the co-aligned openings 46 and 62, with the ribs and slots of the insert and its housing co-related with one another. The elongation of the openings 62 permits vertical stress relief after assembly. It will also be observed that the arms may be constrained inwardly to vary the thickness of the housing by virtue of the space which exists between the outer ends of the arms and the shank.

A second major component of the invention is a female housing 82 comprising a base 84 with a forward step 86. The female housing is normally vertically disposed by fixed connection of the same in the recess 16 of the abutment tooth 14. The housing includes a bight wall 88 having inwardly converging side arms 90, 92 and divergent flanges 94, 96, respectively, on each of said arms.

The male connector 24 in assembled condition is secured, following adjustments, in the recess 22 of the denture by known dentistry procedures, the female housing 82 having been previously positioned in the abutment tooth. The insert 50 is at this point in the installation procedure collapsed. The attachment is then fitted to a desired degree of tension through trial and error inward adjustment of the screw 74 through expansion of the insert head.

I claim:

1. In a denture attachment comprising a male connector element formed of resilient material and comprising a normally upright channel shaped housing having a bight from the opposed ends of which project a pair of spaced apart confronting arms, the male connector including an insert having a shank and an enlarged head, the housing being embedded in a denture, the head having a vertical slit formed therein, and a female housing mounted fixedly in a tooth adjoining said denture and having an internal configuration shaped to receive said insert and fixedly retaining the same therein, that improvement comprising:

vertical ribs projecting inwardly on said confronting arms to interfit with complementary slots formed in said shank;

the arms and the shank having a series of coaxially aligned openings extending transversely therethrough;

changeable fasteners extended through said openings to fixedly engage the shank to the arms;

the head having a horizontal, internally threaded bore intersecting the slit therein said bore having an enlarged, tapered entry section, and the bore extending into the slit with the slit at its approximate center line; and a threaded member having a portion of tapered form, whereby inward engagement within the bore expands the head laterally, the head being of a first outside dimension with the threaded member in extended position and upon such expansion being of a second outside dimension tightly engaged in the female housing.

2. The improvement of claim 1, wherein: the changeable fastener comprises screw and nut means.

3. The improvement of claim 1, wherein: the fasteners comprise rivet means.

4. The invention of claim 1, wherein: the said fasteners are of non-rigid material.

5. The improvement of claim 4, and: a rigid core within said non-rigid material.

6. The improvement of claim 1, wherein: said openings in said shank are vertically elongated.

* * * * *